United States Patent
Rhoades

(10) Patent No.: US 7,107,443 B2
(45) Date of Patent: Sep. 12, 2006

(54) METHOD FOR CUSTOMIZING A COMPUTER SYSTEM BY USING STORED CONFIGURATION PARAMETERS IN A CONFIGURISM MECHANISM

(75) Inventor: David B. Rhoades, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 431 days.

(21) Appl. No.: 10/748,431

(22) Filed: Dec. 30, 2003

(65) Prior Publication Data

US 2005/0149607 A1    Jul. 7, 2005

(51) Int. Cl.
*G06F 9/00* (2006.01)
(52) U.S. Cl. .............................. 713/1; 713/2
(58) Field of Classification Search .............. 713/1, 713/2, 100; 709/217, 220
See application file for complete search history.

(56) References Cited

U.S. PATENT DOCUMENTS

| | | | |
|---|---|---|---|
| 5,404,580 A * | 4/1995 | Simpson et al. ............. | 455/558 |
| 5,991,875 A * | 11/1999 | Paul .............................. | 713/2 |
| 6,012,088 A * | 1/2000 | Li et al. ....................... | 709/219 |
| 6,115,384 A | 9/2000 | Parzych ....................... | 370/401 |
| 6,173,331 B1 | 1/2001 | Shimonishi .................. | 709/232 |
| 6,353,885 B1 * | 3/2002 | Herzi et al. ..................... | 713/1 |
| 6,578,142 B1 | 6/2003 | Anderson et al. .............. | 713/2 |
| 6,851,614 B1 * | 2/2005 | Garnett ........................ | 235/487 |
| RE38,762 E * | 7/2005 | O'Connor ....................... | 713/2 |
| 6,961,791 B1 * | 11/2005 | Cepulis ........................ | 710/104 |
| 2003/0018746 A1 * | 1/2003 | Boesch ........................ | 709/218 |
| 2003/0036875 A1 | 2/2003 | Peck et al. ................... | 702/127 |
| 2003/0037325 A1 | 2/2003 | Hargrove et al. ............. | 71/175 |

* cited by examiner

*Primary Examiner*—James K. Trujillo
*Assistant Examiner*—Paul Yanchus, III
(74) *Attorney, Agent, or Firm*—Cynthia S. Byrd

(57) ABSTRACT

The present invention is related to a system and method for customizing a computer system. According to a first aspect of the preferred embodiment of the present invention, the method includes providing a configuration mechanism in the computer system and transmitting customization information for the computer system to the configuration mechanism. The customization information in the configuration mechanism is then retrieved by the computer system to customize the computer system. In a second aspect, a computer system includes a central processing unit (CPU), memory coupled to the CPU, and a configuration mechanism coupled to the CPU for storing customization information for the computer system, whereby the CPU retrieves during a first system boot the customization information in the configuration mechanism to automatically customize the computer system.

1 Claim, 2 Drawing Sheets

METHOD FOR CUSTOMIZING A COMPUTER SYSTEM BY USING STORED CONFIGURATION PARAMETERS IN A CONFIGURISM MECHANISM

FIELD OF THE INVENTION

The present invention relates to computer systems and more particularly to a method and system for customizing a computer system.

BACKGROUND OF THE INVENTION

Typically, a computer system is provided with a preconfigured operating system (OS), which is then customized or configured for a specific user. The configuration of the OS generally involves assigning configuration parameters, such as a computer name, host name, host IP address, host gateway, host subnet, etc., to the computer system, and can be performed by a reseller or dealer, on site via an automated process, or on site by the specific user.

If performed by the reseller or dealer, the computer system's final destination must be known prior to the configuration process. For large computer system rollouts, the dealer will typically store a large quantity of computer systems and customize them as they are deployed to various destinations. If these computer systems are not shipped immediately to their respective destinations, but warehoused instead, the dealer must be able to identify a particular computer system, e.g., by serial number, for a particular destination at shipping time. Physically identifying the particular computer system among thousands of warehoused computer systems can be a daunting task. If the computer system is shipped to an incorrect destination, the configuration parameters embedded in the computer system's OS will not correspond to the destination, and the computer system will not operate correctly.

At the user's site, the system configuration can be deployed via an automated process, e.g., by transmitting the customized OS over a network link. Nevertheless, this process requires network bandwidth and if the customized OS is large, e.g., 10–15 gigabytes, the transmission can take hours. Alternatively, the OS can be customized manually by the user, which introduces data entry errors. Moreover, for complex program images, it may be necessary to incur the expense of hiring a skilled configuration expert to handle the customization.

Accordingly, there exists a need for a method and system for customizing a computer system. The method and system should allow the computer system to be configured quickly at the dealer or on site, and should have little or no impact on network bandwidth. The present invention addresses such a need.

SUMMARY OF THE INVENTION

The present invention is related to a system and method for customizing a computer system. According to a first aspect of the preferred embodiment of the present invention, the method includes providing a configuration mechanism in the computer system and transmitting customization information for the computer system to the configuration mechanism. The customization information in the configuration mechanism is then retrieved by the computer system to customize the computer system. In a second aspect, a computer system includes a central processing unit (CPU), memory coupled to the CPU, and a configuration mechanism coupled to the CPU for storing customization information for the computer system, whereby the CPU retrieves during a first system boot the customization information in the configuration mechanism to automatically customize the computer system.

Through aspects of the preferred embodiment of the present invention, the configuration mechanism includes an Ethernet port that is connected to a server via a LAN. The server is able to detect when the computer system is initially connected to the network, and transmits the customization information to the configuration mechanism. During a first system boot, the computer system queries the configuration mechanism to retrieve the customization information stored therein.

DETAILED DESCRIPTION

The present invention relates to computer systems and more particularly to a method and system for customizing a computer system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

According to the preferred embodiment of the present invention, configuration parameters that are utilized to customize a computer system's OS are transmitted to and stored in a configuration mechanism in the computer system. The configuration mechanism preferably is a PCI adapter that includes at least one communication port connected to a network. When coupled to the computer system, the configuration mechanism provides the necessary information to customize the computer system.

Through aspects of the preferred embodiment of the present invention, a generic computer system is shipped to the remote branch office with a configuration mechanism that has not yet been programmed with the configuration parameters. When the computer system is installed at the remote branch, a system administrator at a central office transmits the configuration parameters to the configuration mechanism via the at least one communication port. The computer system then proceeds to customize its OS via the now programmed configuration mechanism.

Figure 1:
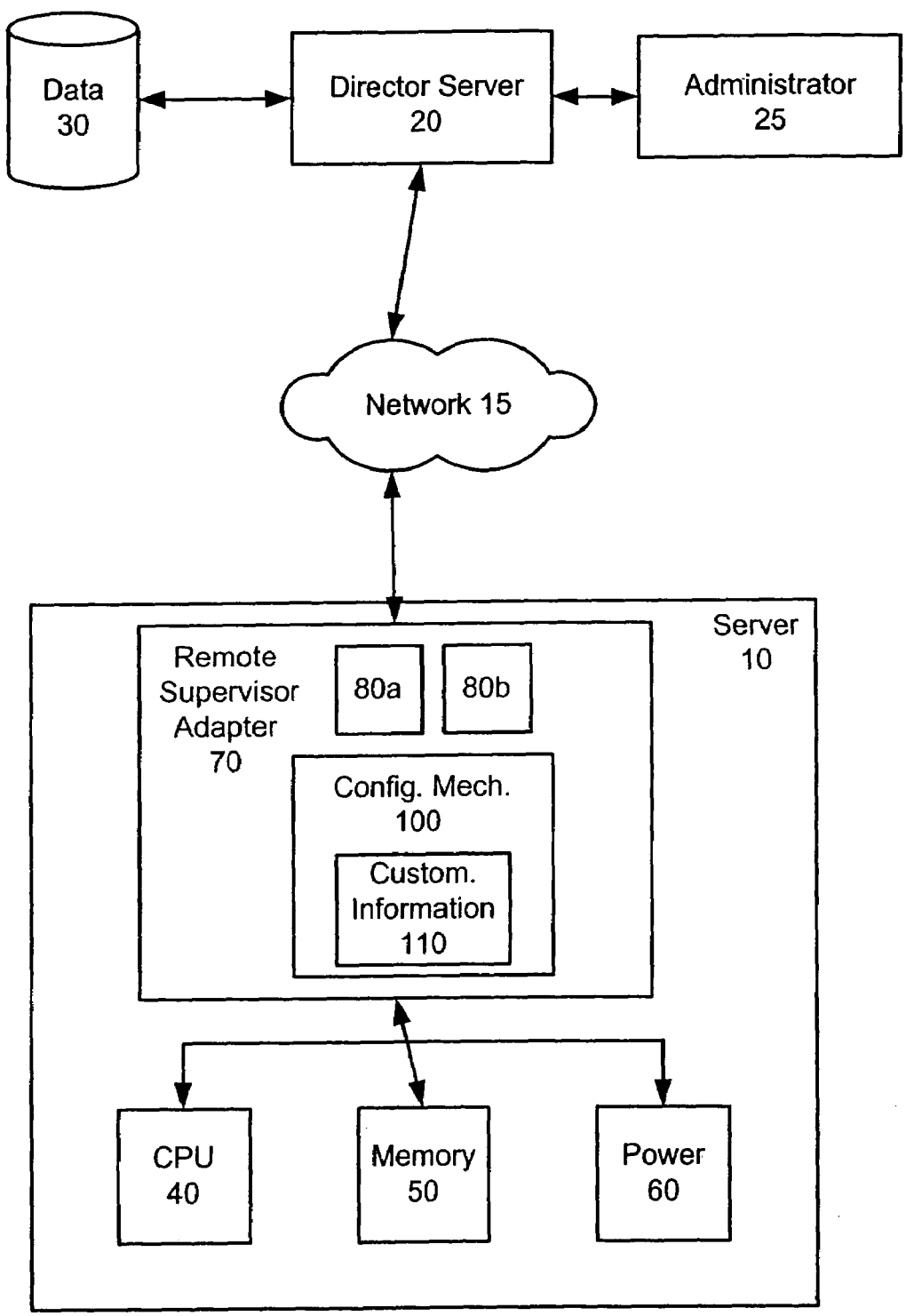
FIG. 1 is a block diagram depicting a computer system 10 according to a preferred embodiment of the present invention.

To describe the preferred embodiment of the present invention in more detail, please refer now to FIG. 1, which is a block diagram depicting a computer system 10 according to a preferred embodiment of the present invention. The computer system 10 preferably is a server 10, such as an xSeries™ server developed by International Business Machines of Armonk, N.Y. As is shown, the server 10 includes standard components, such as a CPU 40, memory 50, and a power source or adapter 60. Those skilled in the art readily appreciate that the server 10 includes other standard components and devices that are not illustrated in FIG. 1. The server 10 also includes a remote supervisor adapter (RSA) 70, which allows a system administrator 25 to manage the server 10 remotely via a Director server 20.

The RSA 70 provides continuous remote access to the server 10 regardless of the on or off status of the server 10. In addition, the RSA 70 continuously monitors critical system components for potential problems and alerts the administrator 25 of events that can impact the system operation. The RSA 70 is a PCI adapter that includes a serial port 80a for supporting system management functions through a modem, an Ethernet port 80b for enabling system management functions over a LAN connection, and a power connector and AC adapter (not shown). Through the Ethernet port 80b, the RSA 70 can be connected directly to a data network or to a dedicated management LAN 15. The system management functions of the RSA 70 can be exploited at any time or anywhere from the LAN 15, even if the server 10 has failed or is powered off. Moreover, LAN throughput allows for increased performance and additional functions.

According to a preferred embodiment of the present invention, the RSA 70 includes a configuration mechanism 100. The configuration mechanism 100 stores customization information 110, including configuration parameters, that are used to personalize the server 10. Such configuration parameters include IP address information, computer name, host name and other personalized information. While FIG. 1 shows the configuration mechanism 100 integrated in the RSA 70, those skilled in the art would appreciate that the configuration mechanism 100 can also be a stand alone module coupled to a PCI adapter, such as the RSA 70.

Figure 2:
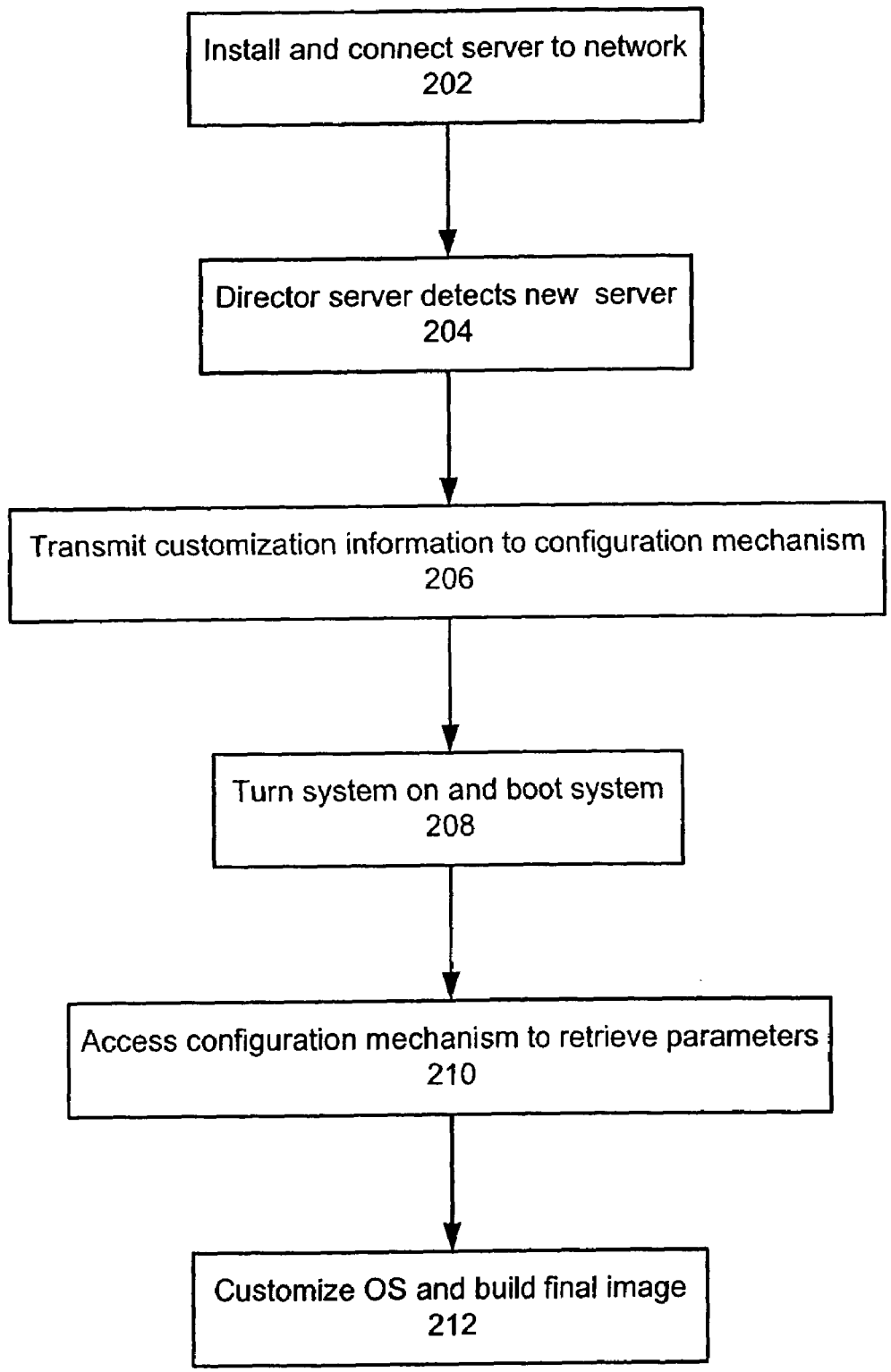
FIG. 2 is a flowchart illustrating a process for customizing the server 10 according to a preferred embodiment of the present invention.

To describe how the configuration mechanism 100 is utilized to customize the server 10, please refer now to FIG. 2, which is a flowchart illustrating a process for customizing the server 10 according to a preferred embodiment of the present invention. The process begins at step 202 when the customer installs and connects the server 10 to the network 15 at the customer site. At this time, although AC power is applied to the server 10, the server 10 has not been turned "on." Once the server 10 is connected to the network 15, the Director server 20 has the ability to detect, i.e., discover, the new server 10 via the RSA 70. Thus, in step 204, the Director server 20 detects the new server 10. Alternatively, the configuration mechanism 100 transmits a notification to the Director server 20 requesting the customization information when the server 10 is coupled to the network 15. Preferably, the connection between the Director server 20 and the server's RSA 70 is an "out-of-band" communication link via the RSA's Ethernet port 80b.

In step 206, the system administrator 25 uses the Director server 20 to transmit the customization information 110 for the server 10 to the configuration mechanism 100 in the server 10 via the RSA 70. Preferably, the transmission is over a dedicated LAN 15 into the RSA's Ethernet port 80b. Accordingly, the time to transmit the customization information 10 to the configuration mechanism 100 is minimal. After this step, the customization information 110 is stored in the configuration mechanism 100, and accessible by the server 10. In step 208, the server 10 is turned "on" either by the customer or by the system administrator 25 via the Director server 20, and the server 10 begins a first booting process.

During the first system boot, the server 10 queries the RSA 70, accesses the configuration mechanism 100 and retrieves the customization information 110, including the configuration parameters via step 210. In a preferred embodiment, the customization information 110 is embedded into corresponding sections of a SysPrep.INF file, which is utilized during a SysPrep process. It is noted that while SysPrep is the application/supported process for MicroSoft operating systems, the customization information 110 can also be embedded in portions of equivalent applications and processes used for other operating systems well known in the art, e.g., Linux, Unix. The configuration parameters 110 are then used to customize the OS and to build the final system image in step 212. In a preferred embodiment, the customizing step can be performed by booting first into a DOS partition that calls the RSA 70 and performs the personalization prior to loading the OS.

While the above process describes a system administrator 25 transmitting the customization information 110 to the configuration mechanism 100, those skilled in the art will recognize that other parties can also perform the transmitting step as well. For instance, a dealer or even a third party shipping company can offer this service to its customers. Because the information transfer process is relatively fast and allows the server 10 to be personalized at the customer's site, deployment cost, time and manpower are minimized.

Through aspects of the preferred embodiment of the present invention, a computer system can be automatically customized at a customer site during the first system boot. By transmitting the customization information 110 to the configuration mechanism 100 via a dedicated LAN, network bandwidth is not impacted. Moreover, because the server 10 is automatically customized at the customer's site, there is no danger of shipping a warehoused system that has been preconfigured to the incorrect address, or of erroneously entering the information.

Although the present invention has been described in accordance with the embodiment shown, one of ordinary skill in the art will readily recognize that there could be variations to the embodiment and those variations would be within the spirit and scope of the present invention. For example, the configuration mechanism can be implemented as a stand alone PCI adapter and does not necessarily require an RSA. Accordingly, many modifications may be made by one of ordinary skill in the art without departing from the spirit and scope of the appended claims.

What is claimed is:

1. A method for customizing a computer system, comprising the steps of:

receiving a customer order, wherein the customer order specifies customization information for a computer system;

sending a computer system to the customer, the computer system including a network port through which configuration parameters corresponding to the customization information specified in the customer order can be received, and a configuration mechanism for storing the configuration parameters received via the network port, the computer system being adapted to customize the computer system according to the configuration parameters stored in the configuration mechanism;

providing instructions to the customer to connect the network port of the computer system to a network; and transmitting the customization parameters over the network and to the network port of the computer system for storage in the configuration mechanism;

providing instructions to the customer to initiate a boot process;

wherein, the computer system includes a data storage device having a first partition including a first operating system, and a second partition including a second operating system and, in response to the initiation of the boot process, the computer system first boots to the second partition to execute the second operating system which causes the first operating system in the first partition to be customized according to the configuration parameters stored in the configuration mechanism and, upon completion of the customization of the first operating system, the computer system boots to the first partition and executes the first operating system.

* * * * *